No. 834,966. PATENTED NOV. 6, 1906.
R. B. CALCUTT.
TIRE FOR WHEELS.
APPLICATION FILED NOV. 25, 1905.

2 SHEETS—SHEET 1.

Witnesses:
Inventor:
Reginald B. Calcutt
by Frank D. Thomason
Atty.

No. 834,966. PATENTED NOV. 6, 1906.
R. B. CALCUTT.
TIRE FOR WHEELS.
APPLICATION FILED NOV. 25, 1905.

2 SHEETS—SHEET 2

Witnesses:
O. M. Hennick
E. K. Lundy

Inventor.
Reginald B. Calcutt
by Franks Thomson
Atty.

UNITED STATES PATENT OFFICE.

REGINALD B. CALCUTT, OF CHICAGO, ILLINOIS.

TIRE FOR WHEELS.

No. 834,966.     Specification of Letters Patent.     Patented Nov. 6, 1906.

Application filed November 25, 1905. Serial No. 289,069.

*To all whom it may concern:*

Be it known that I, REGINALD B. CALCUTT, a citizen of the United States, and a resident of Chicago, Cook county, Illinois, have invented certain new and useful Improvements in Tires for Wheels, of which the following is a full, clear, and exact description.

The object of my invention is to provide a simple yet valuable improvement in tires for wheels, and particularly wheels for baby-carriages, toy carts, velocipedes, &c., requiring resiliency and at the same time economy of construction. This I accomplish by the means hereinafter fully described, and as particularly pointed out in the claims.

Figure 1:
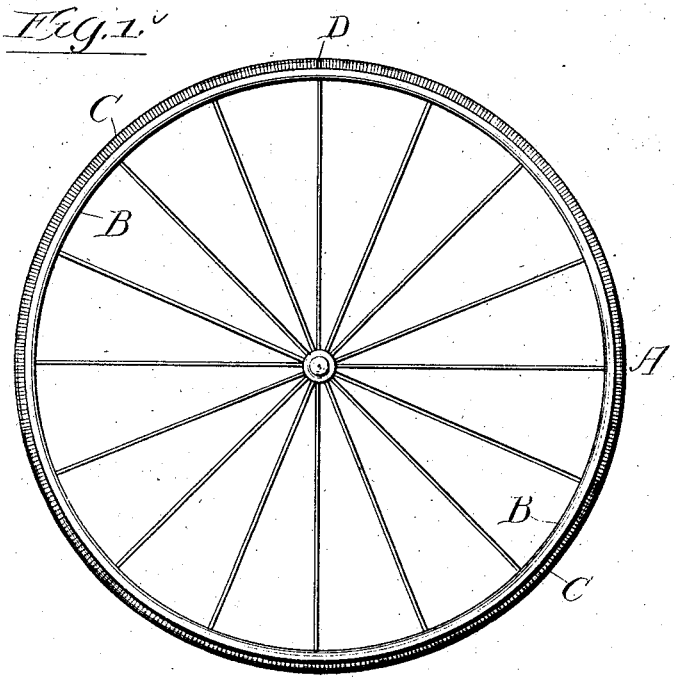
Figure 2:
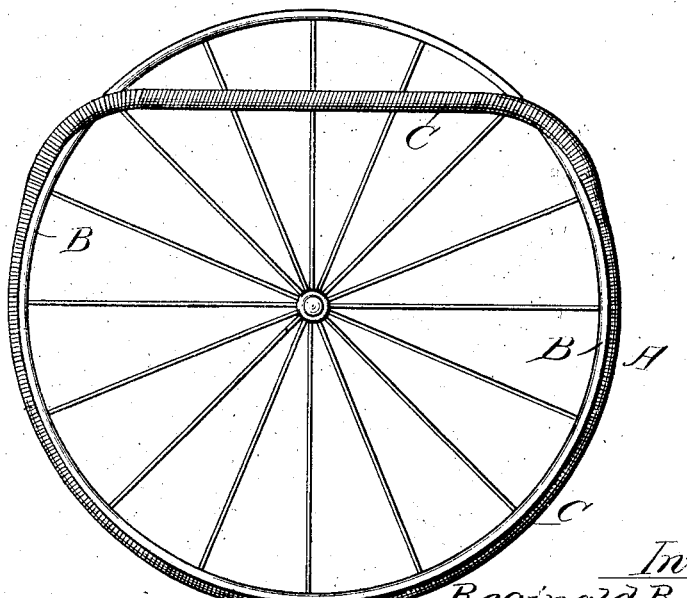
Figure 3:
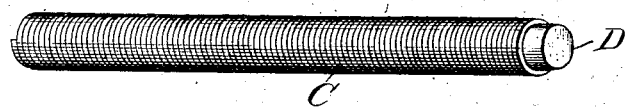
Figure 4:
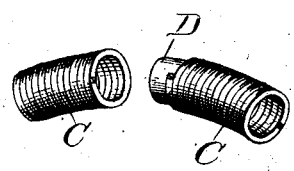
Figure 5:
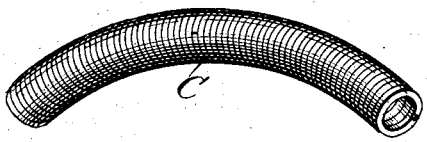
Figure 6:
Figure 8:
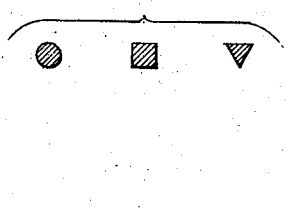
Figure 7:
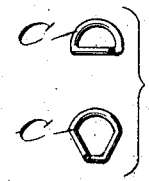

In the drawings, Figure 1 is a side view of a wheel having my invention applied thereto. Fig. 2 is a similar view showing the position of my improved tire when about to be snapped or sprung onto the rim of the wheel. Fig. 3 is a perspective view of one end of said tire, drawn to a larger scale. Fig. 4 is a perspective view of both ends of said tire in position ready to be coupled, drawn to a larger scale. Fig. 5 is a similar view showing said ends coupled. Fig. 6 is a perspective view of the coupling. Fig. 7 shows cross-sections of a group of differently-constructed coils. Fig. 8 shows a group of cross-sections of wire of the coils of exaggerated gage.

Referring to the drawings, A represents a skeleton wheel, such as commonly used for baby-carriages, toy carts, velocipedes, &c. The rim B of this wheel is concave, and seated therein is a coiled-wire tire C, of suitable diameter and of sufficient length so that when its ends are connected it will be slightly stretched or elongated, and thereby held securely in its seat.

In order to secure the ends of the coiled-wire tire together, I prefer to employ a smooth cylindrical coupling D, which is preferably about an inch or an inch and one-half long for tires for the smaller class of wheels. This coupling is of the same or slightly greater diameter as the bore of the coil-wire tire and is first inserted about half its length in one end of the tire and then when the two ends are brought together is inserted in the bore of the opposite end. When the endless tire is stretched, as shown in Fig. 2 of the drawings, into its concaved seat in the rim of the wheel, the constriction of the coil-wire tire upon the coupling is so great that the ends of the tire securely clamp and are held together by the coupling.

The wire may be of any desired shape in cross-section, substantially as shown in Fig. 8 of the drawings, and the coil made from this wire may be made to outline any of the usual shapes of resilient tires made of rubber or other suitable material, whereby they are adapted to be seated in the rims of wheels whose channeled circumference is otherwise than concaved, substantially as shown in Fig. 8 of the drawings.

The coiled-wire tires may be coated, if desired, with any suitable material to prevent rusting, and it will be noticed that the coupling itself may be either solid or tubular.

It is obvious that while I have hereinbefore described my invention as more suitable for the wheels of small vehicles, it may be used for tires of large wheels for heavier vehicles. In such an event the gage of the wire would necessarily be greater, and the means for connecting the ends of the coils be adequate to withstand the greater strain to which the tire would be put. It will be understood that the resiliency of the tires and the tenacity with which they retain their seats in the concave or channel of the rim depends upon the extent to which the coiled wire is stretched and the coils are opened or separated from each other, as well as upon the quality of wire employed.

What I claim as new is—

1. A tire for wheels comprising a suitable length of coiled wire bent into a circle to bring its ends together and a frictionally-retained coupling made of one piece of metal inserted partly in the bore of one end of said coiled wire and partly in the bore of the other to secure said ends together.

2. A tire for wheels consisting of coiled wire the outer circumference of which constitutes the tread of the wheel; and a frictionally-retained cylindrical coupling made of one piece of metal and inserted partly in the bore of one end of said coiled wire and partly in the bore of the other to secure said ends together.

3. A tire for wheels consisting of coiled wire the outer circumference of which constitutes the tread of the wheel, and a frictionally-retained coupling made of one piece of metal having a smooth unbroken surface and inserted partly in the bore of one end of said coiled wire and partly in the bore of the other to secure said ends together.

4. A tire for wheels consisting of coiled wire the outer circumference of which constitutes the tread of the wheel, and a frictionally-retained cylindrical coupling made of one piece of metal having a smooth unbroken surface and inserted partly in the bore of one end of said coiled wire and partly in the bore of the other to secure said ends together.

5. A tire for wheels consisting of stretched coiled wire the outer circumference of which constitutes the tread of the wheel, and a frictionally-retained coupling made of one piece of metal having a smooth unbroken surface and inserted partly in the bore of one end of said coiled wire and partly in the bore of the other to secure said ends together.

6. A tire for wheels consisting of stretched coiled wire the outer circumference of which constitutes the tread of the wheel, and a frictionally-retained cylindrical coupling made of one piece of metal having a smooth unbroken surface and inserted partly in the bore of one end of said coiled wire and partly in the bore of the other to secure said ends together.

In testimony whereof I have hereunto set my hand this 21st day of November, 1905.

REGINALD B. CALCUTT.

Witnesses:
FRANK D. THOMASON,
E. K. LUNDY.